United States Patent
Araki et al.

(10) Patent No.: US 8,093,876 B2
(45) Date of Patent: Jan. 10, 2012

(54) POWER CONTROL CIRCUIT TO PREVENT A MALFUNCTION OF A PROTECTION CIRCUIT

(75) Inventors: Kyoichiro Araki, Kyoto (JP); Hironori Nakahara, Kyoto (JP); Yoshinori Imanaka, Kyoto (JP); Isao Yamamoto, Kyoto (JP)

(73) Assignee: Rohm Co., Ltd. (JP)

( * ) Notice: Subject to any disclaimer, the term of this patent is extended or adjusted under 35 U.S.C. 154(b) by 319 days.

(21) Appl. No.: 12/447,766

(22) PCT Filed: Oct. 29, 2007

(86) PCT No.: PCT/JP2007/071049
§ 371 (c)(1),
(2), (4) Date: Apr. 29, 2009

(87) PCT Pub. No.: WO2008/053850
PCT Pub. Date: May 8, 2008

(65) Prior Publication Data
US 2010/0066336 A1 Mar. 18, 2010

(30) Foreign Application Priority Data
Oct. 31, 2006 (JP) .................................. 2006-297119

(51) Int. Cl.
*G05F 1/00* (2006.01)
(52) U.S. Cl. ....................................... 323/284; 323/283
(58) Field of Classification Search .................. 323/222, 323/223, 225, 268, 271, 282–287
See application file for complete search history.

(56) References Cited

U.S. PATENT DOCUMENTS

| 7,133,300 | B1* | 11/2006 | Yang ........................... 363/56.11 |
| 7,511,460 | B1* | 3/2009 | Chen et al. ..................... 323/222 |
| 2005/0111149 | A1 | 5/2005 | Motomori | |
| 2006/0164057 | A1 | 7/2006 | Kudo et al. | |
| 2006/0284608 | A1* | 12/2006 | Lipcsei et al. ................ 323/284 |
| 2007/0120540 | A1* | 5/2007 | Sase et al. ..................... 323/222 |
| 2009/0039853 | A1* | 2/2009 | Omi .............................. 323/284 |

FOREIGN PATENT DOCUMENTS

| JP | 5-92819 U | 12/1993 |
| JP | 11-289754 A | 10/1999 |
| JP | 2002-58239 A | 2/2002 |

(Continued)

OTHER PUBLICATIONS

International Search Report for International Application No. PCT/JP2007/071049 mailed Jan. 29, 2008 with English Translation.

*Primary Examiner* — Matthew Nguyen
*Assistant Examiner* — Gary Nash
(74) *Attorney, Agent, or Firm* — Cantor Colburn LLP

(57) ABSTRACT

A control circuit 10 according to the present invention transits to a first current limiter mode when an output current of a DC-DC converter circuit reaches an upper limit current or greater in a normal mode; transits to the normal mode when the output current falls below the upper limit current in the first current limiter mode; transits to a second current limiter mode when a first predetermined period elapses without a transition to the normal mode in the first current limiter mode; and transits to the normal mode when a second predetermined period elapses in the second current limiter mode.

8 Claims, 5 Drawing Sheets

FOREIGN PATENT DOCUMENTS

| | | |
|---|---|---|
| JP | 2004-88950 A | 3/2004 |
| JP | 2004-297985 A | 10/2004 |
| JP | 2005-176587 A | 6/2005 |
| JP | 2006-174630 A | 6/2006 |
| JP | 2006-211760 A | 8/2006 |
| JP | 2007-20352 A | 1/2007 |
| WO | 2007/007752 A1 | 1/2007 |

* cited by examiner

PRIOR ART

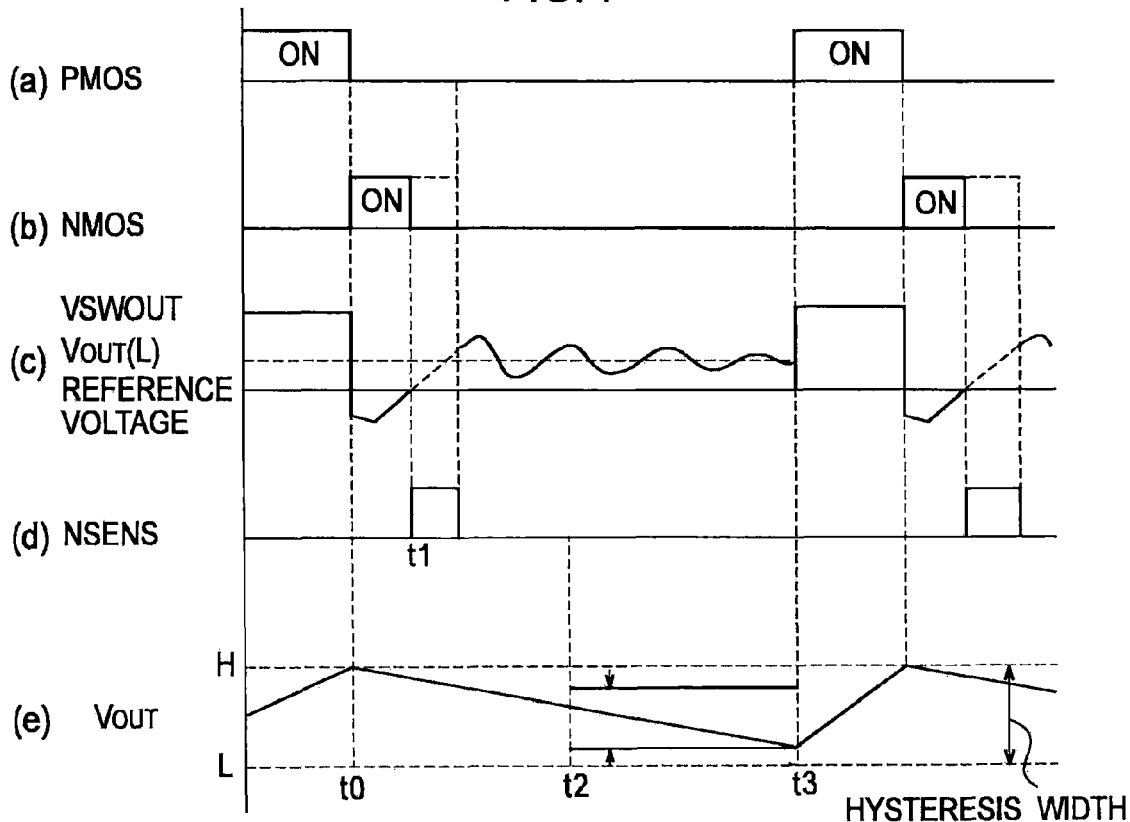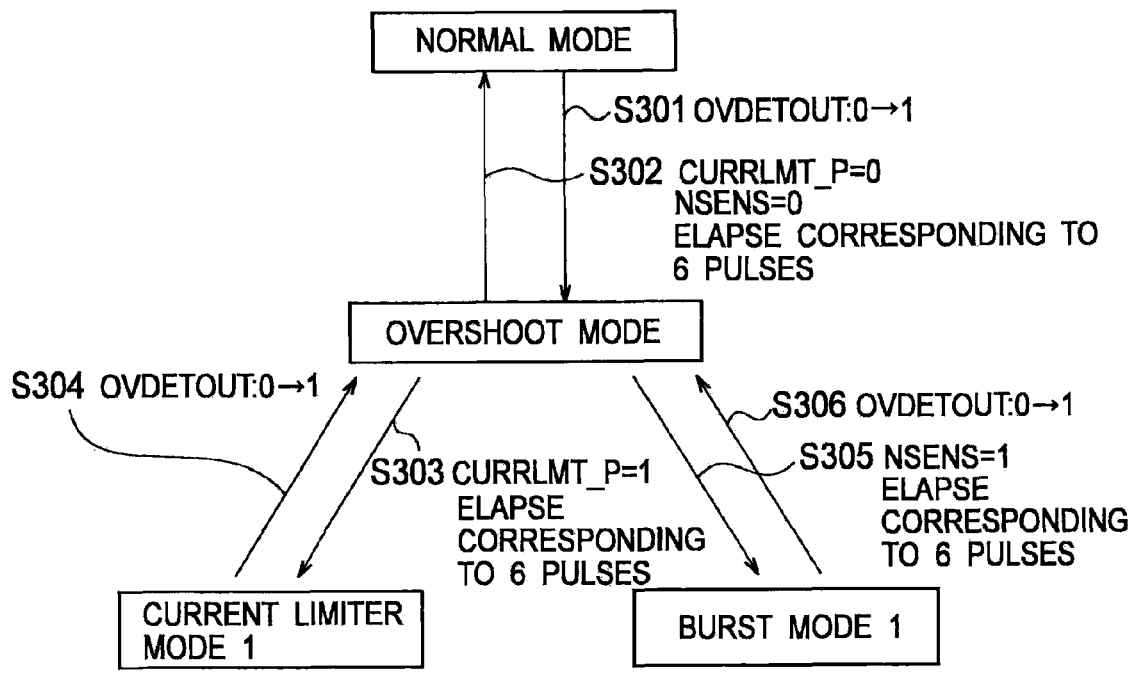

POWER CONTROL CIRCUIT TO PREVENT A MALFUNCTION OF A PROTECTION CIRCUIT

CROSS REFERENCE TO RELATED APPLICATIONS

This is a U.S. national stage of application No. PCT/JP2007/071049, filed on 29 Oct. 2007. Priority under 35 U.S.C. §119(a) and 35 U.S.C. §365(b) is claimed from Japanese Application No. 2006-297119, filed 31 Oct. 2006, the disclosure of which is also incorporated herein by reference.

TECHNICAL FIELD

The present invention relates to a control circuit that sends a control signal to a switch driver circuit that drives a CMOS switch serving as a component of a DC-DC converter circuit.

BACKGROUND ART

In a conventional DC-DC converter circuit, a protection circuit is provided to prevent excess voltage or excess current from destroying a load connected to an output terminal of the DC-DC converter circuit.

FIG. 1 shows one example of the conventional DC-DC converter circuit. As shown in FIG. 1, in the conventional DC-DC converter circuit, a protection circuit including a switch driver circuit 12 and a CMOS switch 13 is provided to prevent excess voltage or excess current from destroying a load 20 connected to an output terminal O.

Patent Document 1: JP-A 11-289754

DISCLOSURE OF THE INVENTION

However, although the conventional DC-DC converter circuit is configured to prevent a malfunction of the protection circuit described above by using CR filters 30 to 32, such configuration has a problem that switching noise may not be removed sufficiently.

Thus, the present invention has been made in view of the above point. An object of the present invention is to provide a control circuit that is capable of preventing a malfunction of a protection circuit without an external control and achieving a low power consumption operation in a DC-DC converter circuit.

A first feature of the present invention is summarized as a control circuit that sends a control signal to a switch driver circuit that drives a CMOS switch serving as a component of a DC-DC converter circuit. The CMOS switch is configured of a PMOS transistor connected to a direct current power supply and an NMOS transistor connected to a ground. The control circuit is configured: to transit to a first current limiter mode when an output current of the DC-DC converter circuit reaches an upper limit current or greater in a normal mode; to transit to the normal mode when the output current falls below the upper limit current in the first current limiter mode; to transit to a second current limiter mode when a first predetermined period elapses in the first current limiter mode without a transition to the normal mode; to transit to the normal mode when a second predetermined period elapses in the second current limiter mode; to send the control signal to the switch driver circuit when the control circuit transits to the first current limiter mode, the control signal instructing to put the PMOS transistor into an intermittent OFF state; and to send the control signal to the switch driver circuit when the control circuit transits to the second current limiter mode, the control signal instructing to put the PMOS transistor into a continuous OFF state.

In the first feature of the present invention, the control circuit may be further configured: to transit to an overshoot mode when an output voltage of the DC-DC converter circuit increases at a predetermined or greater inclination in the first current limiter mode; and to send the control signal to the switch driver circuit when the control circuit transits to the overshoot mode, the control signal instructing to alternately switch each of the PMOS transistor and the NMOS transistor between an ON state and an OFF state.

A second feature of the present invention is summarized as a control circuit that sends a control signal to a switch driver circuit that drives a CMOS switch serving as a component of a DC-DC converter circuit. The CMOS switch is configured of a PMOS transistor connected to a direct current power supply and an NMOS transistor connected to a ground. The control circuit is configured: to transit to a first burst mode when an output voltage of the DC-DC converter circuit reaches a reference voltage or greater while the NMOS transistor is in an ON state in a normal mode; to transit to a second burst mode when a third predetermined period elapses in the first burst mode without a transition to the normal mode; to transit to the normal mode when a transition in an output of a hysteresis comparator to which the output voltage is inputted is detected in the first burst mode or the second burst mode; to send the control signal to the switch driver circuit when the control circuit transits to the first burst mode, the control signal instructing to put each of the PMOS transistor and the NMOS transistor into a continuous OFF state; and to send the control signal to the switch driver circuit when the control circuit transits to the second burst mode, the control signal instructing to put each of the PMOS transistor and the NMOS transistor into the continuous OFF state and to narrow a hysteresis width of the hysteresis comparator.

In the second feature of the present invention, the control circuit may be further configured: to transit to an overshoot mode when an output voltage of the DC-DC converter circuit increases at a predetermined or greater inclination in the first burst mode; and to send the control signal to the switch driver circuit when the control circuit transits to the overshoot mode, the control signal instructing to alternately switch each of the PMOS transistor and the NMOS transistor between an ON state and an OFF state.

A third feature of the present invention is summarized as a control circuit that sends a control signal to a switch driver circuit that drives a CMOS switch serving as a component of a DC-DC converter circuit. The CMOS switch is configured of a PMOS transistor connected to a direct current power supply and an NMOS transistor connected to a ground. The control circuit is configured: to transit to an overshoot mode when an output voltage of the DC-DC converter circuit increases at a predetermined or greater inclination in a normal mode; to transit to a first current limiter mode when an output current of the DC-DC converter circuit reaches an upper limit current or greater after a fourth predetermined period elapses in the overshoot mode; to transit to a first burst mode when the output voltage of the DC-DC converter circuit reaches a reference voltage or greater while the NMOS transistor is in an ON state after the fourth predetermined period elapses in the overshoot mode; to transit to the normal mode when the control circuit does not transit to the first current limiter mode or the first burst mode after the fourth predetermined period elapses in the overshoot mode; to send the control signal to the switch driver circuit when the control circuit transits to the overshoot mode, the control signal instructing to alternately switch each of the PMOS transistor and the NMOS transistor between an ON state and an OFF state; to send the control signal to the switch driver circuit when the control circuit transits to the first current limiter mode, the control signal instructing to put the PMOS transistor into an intermittent OFF state; and to send the control signal to the switch driver circuit when the control circuit transits to the first burst mode, the control signal instructing to put each of the PMOS transistor and the NMOS transistor into a continuous OFF state.

In the third feature of the present invention, the control circuit may transit to the overshoot mode when an output voltage of the DC-DC converter circuit increases at a predetermined or greater inclination in the first current limiter mode.

In the third feature of the present invention, the control circuit may transit to the overshoot mode when an output voltage of the DC-DC converter circuit increases at a predetermined or greater inclination in the first burst mode.

BRIEF DESCRIPTION OF THE DRAWINGS

FIG. 3 is a view showing all the operation modes that the control circuit according to the first embodiment of the present invention can transit to.

FIG. 7 is a waveform diagram of various signals when the control circuit according to the first embodiment of the present invention is in the burst mode 1 or the burst mode 2.

FIG. 8 is a view showing the transition of the control circuit according to the first embodiment of the present invention between the normal mode, an overshoot mode, the burst mode 1, and the current limiter mode 1.

BEST MODES FOR CARRYING OUT THE INVENTION (Configuration of DC-DC Converter Circuit Including Control Circuit According to First Embodiment of Present Invention)

Figure 2:
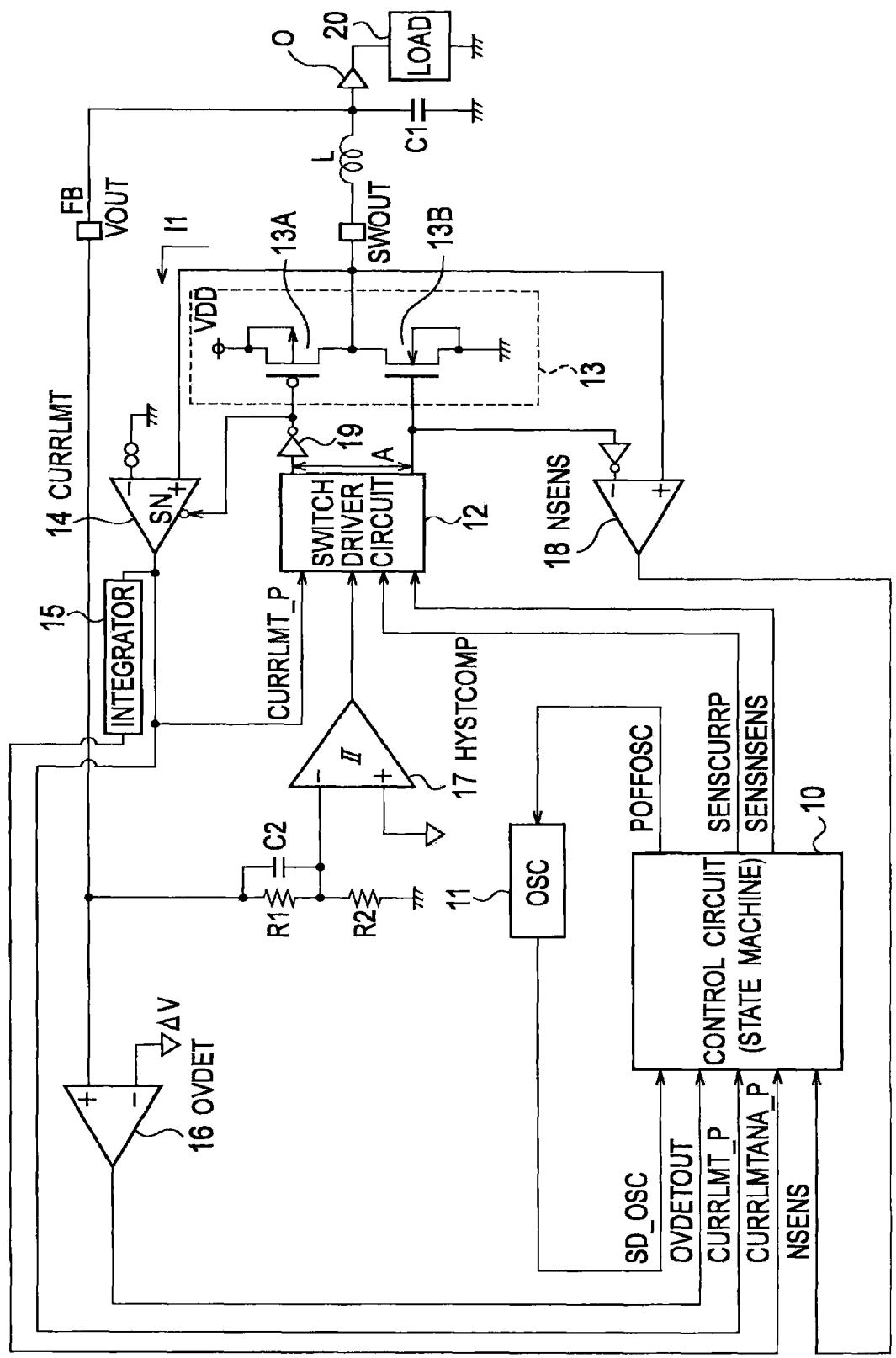
FIG. 2 is a view showing a configuration of a DC-DC converter circuit including a control circuit according to a first embodiment of the present invention.

Referring to FIG. 2, a configuration of a DC-DC converter circuit including a control circuit (state machine) according to a first embodiment of the present invention will be described.

As shown in FIG. 2, the DC-DC converter circuit according to this embodiment includes, as main components, a control circuit 10, a clock oscillator (OSC) 11, a switch driver circuit 12, a CMOS switch 13, a comparator (CURRLMT) 14, an integrator 15, a comparator (OVDET) 16, a hysteresis comparator (HYST COMP) 17, and a comparator (NSENS) 18.

Figure 1:
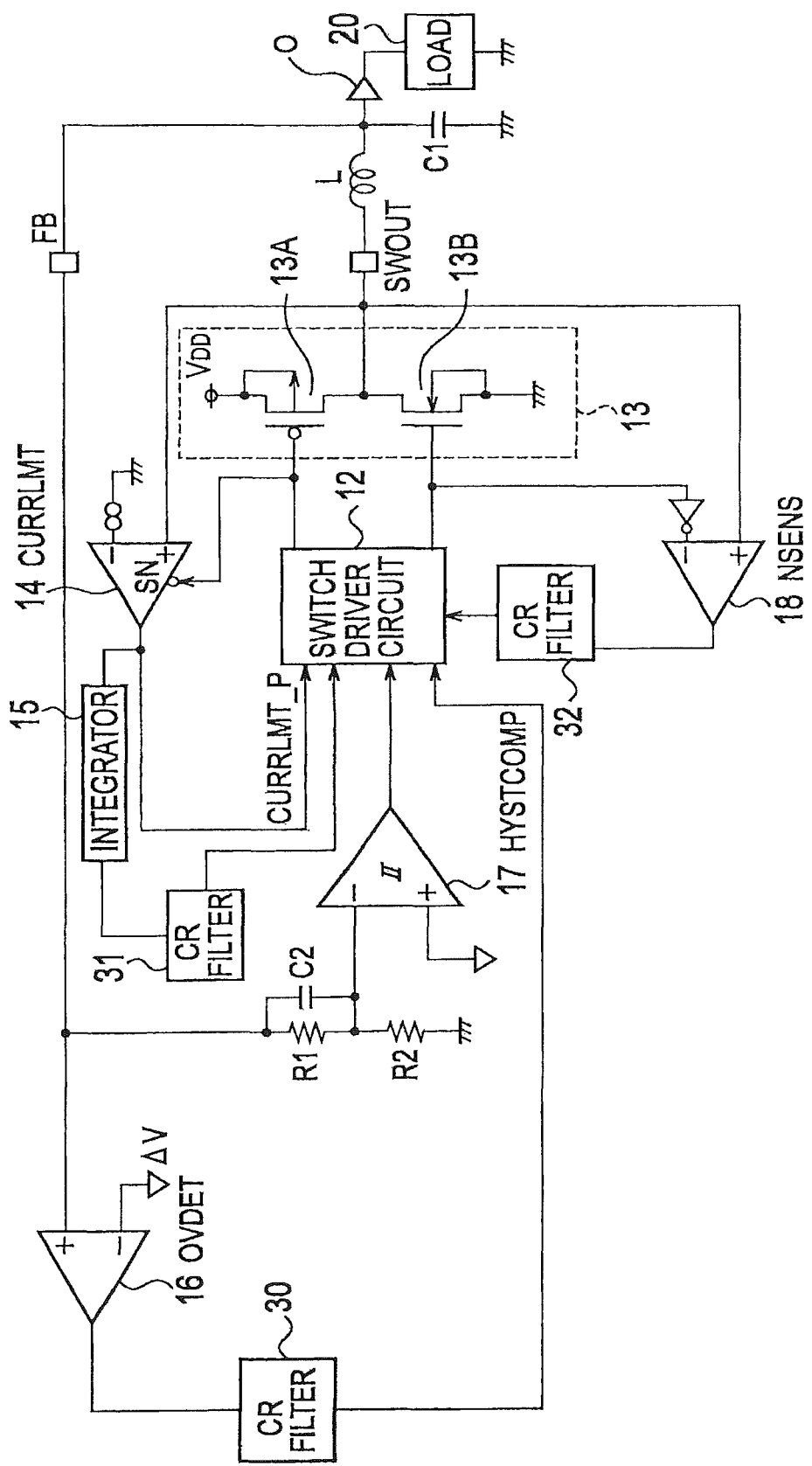
FIG. 1 is a view showing a configuration of a DC-DC converter circuit according to a conventional technique.

Note that, in the same manner as in the case of the conventional DC-DC converter circuit shown in FIG. 1, the CMOS switch 13 is configured by a PMOS transistor 13A connected to a direct current voltage supply $V_{DD}$ and an NMOS transistor 13B connected to the ground.

The comparator 14 is configured to determine whether or not an output current of the DC-DC converter circuit reaches an upper limit current or greater.

In an example of FIG. 2, the comparator 14 is configured to determine whether or not the output current of the DC-DC converter circuit reaches the upper limit current or greater by comparing a current I1 and a reference current of the comparator 14.

Specifically, the comparator 14 is configured to determine that the output current of the DC-DC converter circuit reaches the upper limit current or greater and then output an H level of a determination signal CURRLMT_P, when the current I1 reaches the reference current or greater.

The integrator 15 is configured to input a signal CURRLMTANA_P obtained by integrating the determination signal CURRLMT_P to the control circuit 10.

The comparator 16 is configured to determine whether or not an output voltage of the DC-DC converter circuit increases at a predetermined or greater inclination.

The predetermined inclination herein is set to an optimum value in consideration of a time constant of the DC-DC converter circuit.

In the example of FIG. 2, the comparator 16 is configured to determine whether or not an output voltage $V_{OUT}$ at a terminal FB increases at the predetermined or greater inclination.

Specifically, the comparator 16 is configured to determine that the output voltage of the DC-DC converter circuit increases at the predetermined or greater inclination and then output an H level of a determination signal OVDETOUT, when the output voltage $V_{OUT}$ at the FB terminal increases at the predetermined or greater inclination.

The comparator 18 is configured to determine whether or not the output voltage of the DC-DC converter circuit reaches a reference voltage or greater while the NMOS transistor 13B is in an ON state.

In the example of FIG. 2, the comparator 18 is configured to determine whether or not the output current of the DC-DC converter circuit reaches the reference current or greater while the NMOS transistor 13B is in the ON state by comparing a voltage (output voltage) $V_{SWOUT}$ at a terminal SWOUT and a current (reference voltage) obtained by reversing an output voltage A of the switch driver circuit 12.

Specifically, the comparator 18 is configured to output an H level of a determination signal NSENS when the voltage (output voltage) $V_{SWOUT}$ reaches the reference voltage (i.e., an L level of a voltage obtained by reversing from an H level thereof for turning on the NMOS transistor) while the NMOS transistor 13B is in the ON state or greater.

The hysteresis comparator 17 is configured to be inputted with the output voltage (the output voltage $V_{OUT}$ at the terminal FB in the example of FIG. 2) of the DC-DC converter circuit.

The switch driver circuit 12 is configured to drive the CMOS switch 13 in accordance with a control signal inputted from the control circuit 10, the comparator 14, or the hysteresis comparator 17.

Specifically, the switch driver circuit 12 is configured to switch each of the PMOS transistor 13A and the NMOS transistor 13B that constitute the CMOS switch 13 between the ON state and the OFF state in accordance with the control signal.

The control circuit 10 is configured to send a control signal to the switch driver circuit 12 that drives the CMOS switch 13 in order to prevent excess current or excess voltage from destroying the load 20 connected to an output terminal O of the DC-DC converter circuit.

Also, the control circuit 10 is configured to send the control signal to the switch driver circuit 12 that drives the CMOS switch 13 in order to realize a low power consumption operation in the DC-DC converter circuit.

Note that the control circuit 10 is configured to change the control signal sent to the switch driver circuit 12 in accordance with a present operation mode.

Figure 3:
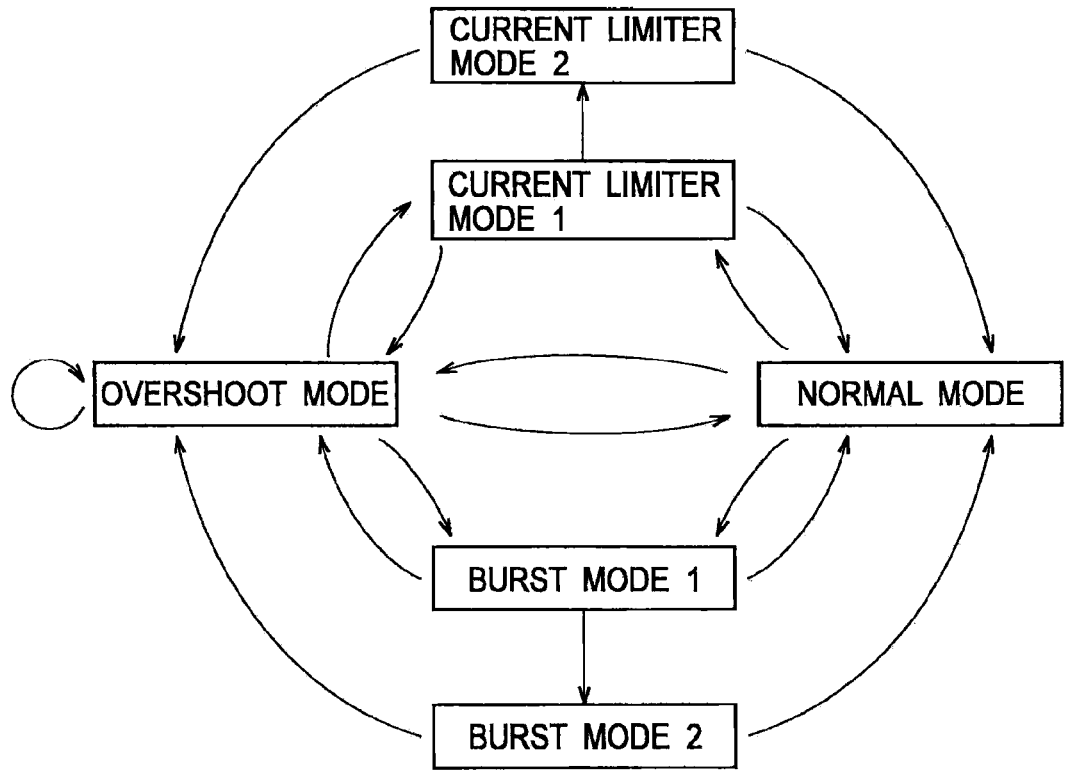

Specifically, as shown in FIG. 3, a normal mode, a current limiter mode 1 (first current limiter mode), a current limiter mode 2 (second current limiter mode), a burst mode 1 (first burst mode), a burst mode 2 (second burst mode), and an overshoot mode are set as the operation modes to which the control circuit 10 can transit.

The normal mode herein is an operation mode in which the control circuit 10 does not particularly send the control signal to the switch driver circuit 12.

In the normal mode, the switch driver circuit 12 controls the CMOS switch 13 such that a synchronous rectification operation is performed by alternately switching each of the PMOS transistor 13A and the NMOS transistor 13B between the ON state and the OFF state.

The current limiter mode 1 is an operation mode in which the control circuit 10 sends a control signal to the switch driver circuit 12, the control signal instructing to put the PMOS transistor 13A into an intermittent OFF state.

That is, when transited to the current limiter mode 1, the control circuit 10 sends the control signal to the switch driver circuit 12, the control signal instructing to put the PMOS transistor 13A into the intermittent OFF state.

The current limiter mode 2 is an operation mode in which the control circuit 10 sends a control signal to the switch driver circuit 12, the control signal instructing to put the PMOS transistor 13A into a continuous OFF state.

That is, when transited to the current limiter mode 2, the control circuit 10 sends the control signal to the switch driver circuit 12, the control signal instructing to put the PMOS transistor 13A into the continuous OFF state.

The burst mode 1 is an operation mode in which the control circuit 10 sends a control signal to the switch driver circuit 12, the control signal instructing to stop the synchronous rectification operation by putting each of the PMOS transistor 13A and the NMOS transistor 13B into the continuous OFF state.

That is, when transited to the burst mode 1, the control circuit 10 sends the control signal to the switch driver circuit 12, the control signal instructing to stop the synchronous rectification operation by putting each of the PMOS transistor 13A and the NMOS transistor 13B into the continuous OFF state.

The burst mode 2 is an operation mode in which the control circuit 10 sends a control signal to the switch driver circuit 12, the control signal instructing to put each of the PMOS transistor 13A and the NMOS transistor 13B into the continuous OFF state and to narrow a hysteresis width of the hysteresis comparator 17.

That is, when transited to the burst mode 2, the control circuit 10 sends the control signal to the switch driver circuit 12, the control signal instructing to put each of the PMOS transistor 13A and the NMOS transistor 13B into the continuous OFF state and to narrow the hysteresis width of the hysteresis comparator 17.

The overshoot mode is an operation mode in which the control circuit 10 sends a control signal to the switch driver circuit 12, the control signal instructing to perform the synchronous rectification operation by alternately switching each of the PMOS transistor 13A and the NMOS transistor 13B between the ON state and the OFF state.

That is, when transited to the overshoot mode, the control circuit 10 sends the control signal to the switch driver circuit 12, the control signal instructing to perform the synchronous rectification operation by alternately switching each of the PMOS transistor 13A and the NMOS transistor 13B between the ON state and the OFF state.

(Operation Mode of Control Circuit According to First Embodiment of Present Invention)

Referring to FIGS. 4 to 8, the operation modes of the control circuit according to the first embodiment of the present invention will be described.

First, referring to FIGS. 4 and 5, the transition of the control circuit 10 according to this embodiment between the normal mode, the current limiter mode 1, and the current limiter mode 2 will be described.

Figure 4:
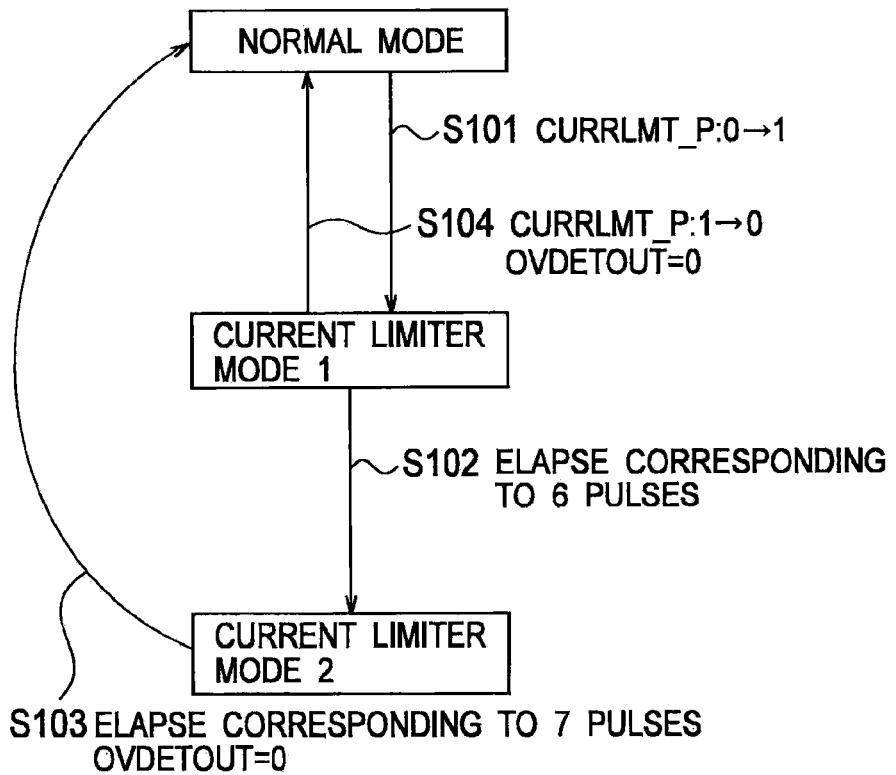
FIG. 4 is a view showing the transition of the control circuit according to the first embodiment of the present invention between a normal mode, a current limiter mode 1, and a current limiter mode 2.

As shown in FIG. 4, in the normal mode, the control circuit 10 transits to the current limiter mode 1 (S101) when the output current (current I1 in the example of FIG. 2) of the DC-DC converter circuit reaches the upper limit current (the reference current of the comparator 14 in the example of FIG. 2) or greater.

Specifically, in the normal mode, the control circuit 10 transits to the current limiter mode 1 when the H level of the determination signal CURRLMT_P is inputted from the comparator 14.

When a first predetermined period elapses in the current limiter mode 1 without a transition to the normal mode, the control circuit 10 transits to the current limiter mode 2 (S102).

Specifically, when transited to the current limiter mode 1, the control circuit 10 sends a control signal POFFOSC to the clock oscillator 11, the control signal POFFOSC instructing to output a clock signal SD_OSC.

When receiving 6 pulses of the clock signal SD_OSC in the current limiter mode 1, the control circuit 10 determines that the first predetermined period elapses without the transition to the normal mode, and then transits to the current limiter mode 2.

When a second predetermined period elapses in the current limiter mode 2, the control circuit 10 transits to the normal mode (S103).

Specifically, when receiving 7 pulses of the clock signal SD_OSC in the current limiter mode 2, the control circuit 10 determines that the second predetermined period elapses, and then transits to the normal mode.

Note that, as described later, upon input of the H level of the determination signal OVDETOUT from the comparator 16 before the second predetermined period elapses, the control circuit 10 transits not to the normal mode but to the overshoot mode.

In addition, when the output current (the current I1 in the example of FIG. 2) of the DC-DC converter circuit falls below the upper limit current (the reference current of the comparator 14 in the example of FIG. 2) in the current limiter mode 1, the control circuit 10 transits to the normal mode (S104).

Specifically, upon input of the L level of the determination signal CURRLMT_P continuously for a certain period of time from the comparator 14 in the current limiter mode 1, the control circuit 10 transits to the normal mode.

Figure 5:
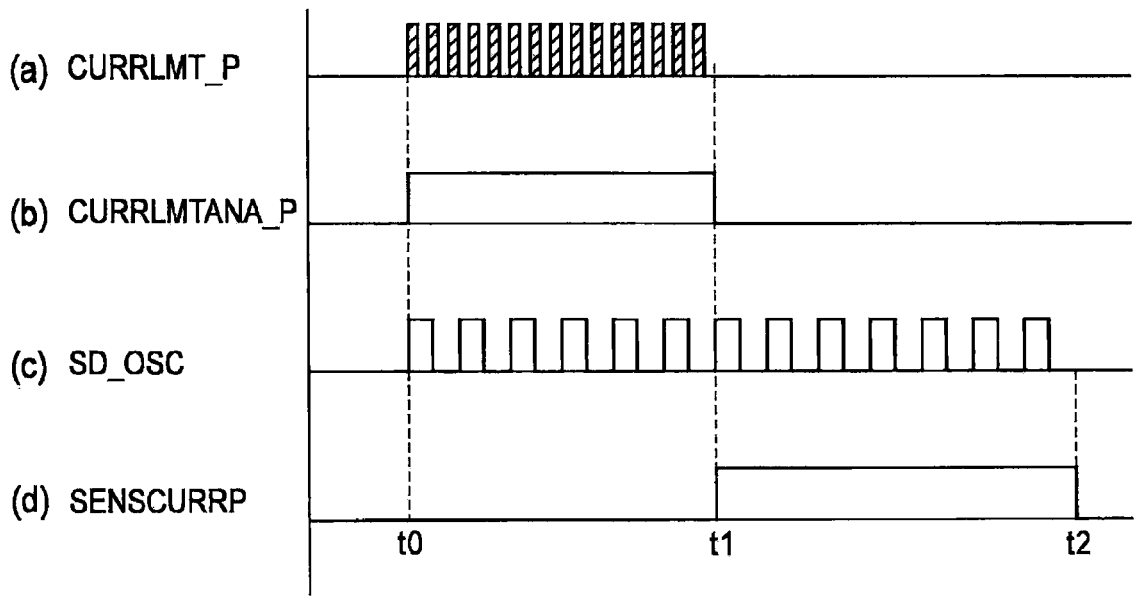
FIG. 5 is a waveform diagram of various signals when the control circuit according to the first embodiment of the present invention is in the current limiter mode 1 or the current limiter mode 2.

In an example of FIG. 5, the control circuit 10 detects that the H level of the determination signal CURRLMT_P is inputted from the comparator 14 at a time $t_0$, transits to the current limiter mode 1, and notifies the switch driver circuit 12 of the transition.

The control circuit 10 determines that 6 pulses of the clock signal SD_OSC are received at a time $t_1$ by monitoring an integral signal CURRLMTANA_P, transits to the current limiter mode 1, and notifies the switch driver circuit 12 of the transition.

Here, the control circuit 10 can notify the switch driver circuit 12 of the transition to the current limiter mode 1 or the current limiter mode 2 by using, for example, a control signal SENSCURR_P.

The control circuit 10 determines that 7 pulses of the clock signal SD_OSC are received at the time $t_1$, transits to the normal mode, and notifies the switch driver circuit 12 of the transition.

The control circuit 10 can notify the switch driver circuit 12 of the transition to the normal mode by using, for example, the control signal SENSCURR_P.

Secondly, referring to FIGS. 6 and 7, the transition of the control circuit 10 according to this embodiment between the normal mode, the burst mode 1, and the burst mode 2 will be described.

Figure 6:
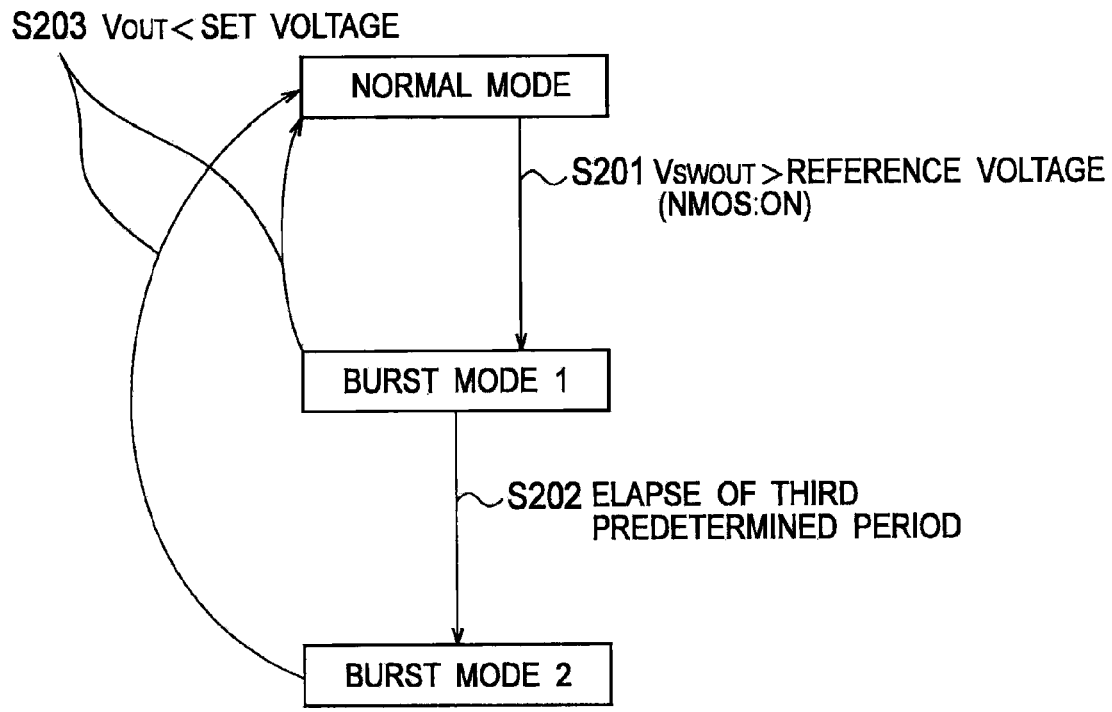
FIG. 6 is a view showing the transition of the control circuit according to the first embodiment of the present invention between the normal mode, a burst mode 1, and a burst mode 2.

As shown in FIG. 6, when the output voltage (the voltage $V_{SWOUT}$ at the terminal SWOUT in the example of FIG. 2) of the DC-DC converter circuit reaches the reference current (the current obtained by reversing the output voltage A of the switch driver circuit 12 from the H level to the L level in the example of FIG. 2) or greater while the NMOS transistor 13B is in the ON state in the normal mode, the control circuit 10 transits to the first burst mode (S201).

Specifically, when it is detected that the H level of the determination signal NSENS is inputted to the control circuit 10 from the comparator 18 in the normal mode, the control circuit 10 transits to the burst mode 1.

When a third predetermined period elapses in the burst mode 1 without a transition to the normal mode, the control circuit 10 transits to the burst mode 2 (S202).

Specifically, when transited to the burst mode 1, the control circuit 10 sends the control signal POFFOSC to the clock oscillator 11, the control signal POFFOSC instructing to output the clock signal SD_OSC.

When receiving 6 pulses of the clock signal SD_OSC in the burst mode 1, the control circuit 10 determines that the third predetermined period elapses without the transition to the normal mode, and then transits to the burst mode 2.

When a transition in an output (for example, an output of an L level) of the hysteresis comparator 17 is detected in the burst mode 1 or the burst mode 2, the control circuit 10 transits to the normal mode (S203).

Specifically, when the voltage $V_{OUT}$ at the terminal FB falls is below an output set voltage of the hysteresis comparator 17, the control circuit 10 transits to the normal mode.

In an example of FIG. 7, the control circuit 10 detects that the H level of the determination signal NSENS is inputted from the comparator 18 at the time $t_1$, transits to the burst mode 1, and notifies the switch driver circuit 12 of the transition by using a control signal SENSNSENS.

The control circuit 10 determines that 6 pulses of the clock signal SD_OSC are received at a time $t_2$, transits to the burst mode 1, and notifies the switch driver circuit 12 of the transition by using the control signal SENSNSENS.

In this case, as shown in FIG. 7(e), at the time $t_2$, the hysteresis comparator 17 narrows the hysteresis width (increases an L-level-output set voltage) in accordance with the instruction from the control circuit 10.

The control circuit 10 detects that the L level of the determination signal NSENS is inputted from the comparator 18 at a time $t_3$, transits to the normal mode, and notifies the switch driver circuit 12 of the transition by using the control signal SENSNSENS.

Thirdly, referring to FIG. 8, the transition of the control circuit 10 according to this embodiment between the normal mode, the overshoot mode, the current limiter mode 1, and the burst mode 1 will be described.

As shown in FIG. 8, when the output voltage (the voltage $V_{OUT}$ at the terminal FB in the example of FIG. 2) of the DC-DC converter circuit increases at a predetermined or greater inclination in the normal mode, the control circuit 10 transits to the overshoot mode (S301).

Specifically, upon input of the H level of the determination signal OVDETOUT from the comparator 16 in the normal mode, the control circuit 10 transits to the overshoot mode and then notifies the switch driver circuit 12 of the transition.

When a transition to the current limiter mode 1 or the burst mode 1 is not performed after a fourth predetermined period elapses in the overshoot mode, the control circuit 10 transits to the normal mode (S302).

Specifically, when, in the overshoot mode, the H level of the determination signal CURRLMT_P is not inputted from the comparator 14 and the H level of the determination signal NSENS is not inputted from the comparator 18 after 6 pulses of the clock signal SD_OSC are received, the control circuit 10 transits to the normal mode and then notifies the switch driver circuit 12 of the transition.

When an output current (a current I2 in the example of FIG. 2) of the DC-DC converter circuit reaches the upper limit current (the current obtained by reversing an output current A of the switch driver circuit 12 in the example of FIG. 2) after the fourth predetermined period elapses in the overshoot mode, the control circuit 10 transits to the current limiter mode 1 (S303).

Specifically, when it is detected that the H level of the determination signal CURRLMT_P is inputted from the comparator 14 after 6 pulses of the clock signal SD_OSC are received in the overshoot mode, the control circuit 10 transits to the current limiter mode 1 and then notifies the switch driver circuit 12 of the transition.

When, in the overshoot mode, the output voltage (the voltage $V_{SWOUT}$ at the terminal SWOUT in the example of FIG. 2) of the DC-DC converter circuit reaches the reference voltage (the voltage obtained by reversing the output voltage A of the switch driver circuit 12 from the H level to the L level in the example of FIG. 2) or greater while the NMOS transistor 13B is in the ON state after the fourth predetermined period elapses, the control circuit 10 transits to the burst mode 1 (S305).

Specifically, when it is detected that the H level of the determination signal NSENS is inputted from the comparator 18 after 6 pulses of the clock signal SD_OSC are received in the overshoot mode, the control circuit 10 transits to the burst mode 1 and then notifies the switch driver circuit 12 of the transition.

When the output voltage (the voltage $V_{OUT}$ at the terminal FB in the example of FIG. 2) of the DC-DC converter circuit increases at a predetermined or greater inclination in the current limiter mode 1, the control circuit 10 transits to the overshoot mode (S304).

Specifically, upon input of the H level of the determination signal OVDETOUT from the comparator 16 in the current limiter mode 1, the control circuit 10 transits to the overshoot mode and then notifies the switch driver circuit 12 of the transition.

When the output voltage (the voltage $V_{OUT}$ at the terminal FB in the example of FIG. 2) of the DC-DC converter circuit increases at a predetermined or greater inclination in the burst mode 1, the control circuit 10 transits to the overshoot mode (S306).

Specifically, upon input of the H level of the determination signal OVDETOUT from the comparator 16 in the burst mode 1, the control circuit 10 transits to the overshoot mode and then notifies the switch driver circuit 12 of the transition.

(Advantageous Effect of Control Circuit According to First Embodiment of Present Invention)

When the output current (the current I1) of the DC-DC converter circuit reaches the upper limit current (the reference current of the comparator 14) or greater, the control circuit 10 according to this embodiment determines that there is a risk of excess current flowing in the load 20, and then transits to the current limiter mode 1. By putting the PMOS transistor 13A connected to the direct current power supply into the intermittent OFF state in the current limiter mode 1, the control circuit 10 can reduce the risk.

When the output current (the current I1) of the DC-DC converter circuit does not fall below the upper limit current (the reference current of the comparator 14) even when the second predetermined period (a period corresponding to 6 pulses) elapses after the transition to the current limiter mode 1, the control circuit 10 according to this embodiment transits to the current limiter mode 2. By putting the PMOS transistor 13A connected to the direct current power supply into the continuous OFF state in the current limiter mode 2, the control circuit 10 can further reduce the risk.

When the PMOS transistor 13A is in the OFF state, the NMOS transistor 13B is in the ON state, and the light load 20 is connected, the control circuit 10 according to this embodiment can realize the low power consumption operation by putting each of the PMOS transistor 13A and the NMOS transistor 13B into the OFF state until a load voltage (i.e., the voltage $V_{OUT}$ at the terminal FB) applied by an electric charge accumulated in a capacitor C1 falls below the L-level-output set voltage of the hysteresis comparator 17.

Specifically, when a light load 20 is connected to the DC-DC converter circuit, a period from the time $t_0$ to the time $t_3$ in FIG. 7(e) is long. Thus, by putting each of the PMOS transistor 13A and the NMOS transistor 13B in the off state, the low power consumption operation can be realized.

When the third predetermined period elapses in the burst mode 1 without returning to the normal mode (i.e., without the voltage $V_{OUT}$ at the terminal FB falling below the L-level-output set voltage of the hysteresis comparator), the control circuit 10 according to this embodiment can shorten the period from the time $t_0$ to the time $t_3$ in FIG. 7(e) to improve the load response by reducing the hysteresis width (output ripple) of the hysteresis comparator 17.

When the output voltage (the voltage $V_{OUT}$ at the terminal FB) of the DC-DC converter circuit increases at the predetermined or greater inclination, the control circuit 10 according to this embodiment determines that there is a risk of excess voltage being applied to the load 20, and then transits to the overshoot mode. The control circuit 10 can stabilize the output voltage to a target voltage by forcibly performing the synchronous rectification operation without performing the low power consumption operation during the fourth predetermined period, hence reducing the above risk.

The present invention has been described in detail by way of the embodiment described above. However, it is clear to those skilled in the art that the present invention is not limited to the embodiment described in this description. The present invention may be carried out in a modified or changed mode without departing from the gist of the present invention defined by the scope of claims. Thus, this description is aimed to illustrate an example, and is not intended, in any way, to limit the present invention.

Note that the disclosure of JP-A 2006-297119 (filed on Oct. 30, 2006) is incorporated in the description of this application by reference in its entirety.

INDUSTRIAL APPLICABILITY

Since a malfunction of a protection circuit can be prevented and a low power consumption operation can be realized without an external control in a DC-DC converter circuit, the present invention is useful for a control circuit that sends a control signal to a switch driver circuit that drives a CMOS switch serving as a component of the DC-DC converter circuit.

The invention claimed is:

1. A control circuit that sends a control signal to a switch driver circuit that drives a CMOS switch serving as a component of a DC-DC converter circuit, wherein
    the CMOS switch is configured of a PMOS transistor connected to a direct current power supply and an NMOS transistor connected to a ground, and
    the control circuit is configured:
        to transit to a first current limiter mode when an output current of the DC-DC converter circuit reaches an upper limit current or greater in a normal mode;
        to transit to the normal mode when the output current falls below the upper limit current in the first current limiter mode;
        to transit to a second current limiter mode when a first predetermined period elapses in the first current limiter mode without a transition to the normal mode;
        to transit to the normal mode when a second predetermined period elapses in the second current limiter mode;
        to send the control signal to the switch driver circuit when the control circuit transits to the first current limiter mode, the control signal instructing to put the PMOS transistor into an intermittent OFF state; and
        to send the control signal to the switch driver circuit when the control circuit transits to the second current limiter mode, the control signal instructing to put the PMOS transistor into a continuous OFF state.

2. The control circuit according to claim 1, wherein the control circuit is further configured:
    to transit to an overshoot mode when an output voltage of the DC-DC converter circuit increases at a predetermined or greater inclination in the first current limiter mode; and
    to send the control signal to the switch driver circuit when the control circuit transits to the overshoot mode, the control signal instructing to alternately switch each of the PMOS transistor and the NMOS transistor between an ON state and an OFF state.

3. A control circuit that sends a control signal to a switch driver circuit that drives a CMOS switch serving as a component of a DC-DC converter circuit, wherein
    the CMOS switch is configured of a PMOS transistor connected to a direct current power supply and an NMOS transistor connected to a ground, and
    the control circuit is configured:
        to transit to a first burst mode when an output voltage of the DC-DC converter circuit reaches a reference voltage or greater while the NMOS transistor is in an ON state in a normal mode;
        to transit to a second burst mode when a third predetermined period elapses in the first burst mode without a transition to the normal mode;

to transit to the normal mode when a transition in an output of a hysteresis comparator to which the output voltage is inputted is detected in the first burst mode or the second burst mode;

to send the control signal to the switch driver circuit when the control circuit transits to the first burst mode, the control signal instructing to put each of the PMOS transistor and the NMOS transistor into a continuous OFF state; and to send the control signal to the switch driver circuit when the control circuit transits to the second burst mode, the control signal instructing to put each of the PMOS transistor and the NMOS transistor into the continuous OFF state and to narrow a hysteresis width of the hysteresis comparator.

4. The control circuit according to claim 3, wherein the control circuit is further configured:

to transit to an overshoot mode when an output voltage of the DC-DC converter circuit increases at a predetermined or greater inclination in the first burst mode; and to send the control signal to the switch driver circuit when the control circuit transits to the overshoot mode, the control signal instructing to alternately switch each of the PMOS transistor and the NMOS transistor between an ON state and an OFF state.

5. A control circuit that sends a control signal to a switch driver circuit that drives a CMOS switch serving as a component of a DC-DC converter circuit, wherein the CMOS switch is configured of a PMOS transistor connected to a direct current power supply and an NMOS transistor connected to a ground, and the control circuit is configured:

to transit to an overshoot mode when an output voltage of the DC-DC converter circuit increases at a predetermined or greater inclination in a normal mode;

to transit to a first current limiter mode when an output current of the DC-DC converter circuit reaches an upper limit current or greater after a fourth predetermined period elapses in the overshoot mode;

to transit to a first burst mode when the output voltage of the DC-DC converter circuit reaches a reference voltage or greater while the NMOS transistor is in an ON state after the fourth predetermined period elapses in the overshoot mode;

to transit to the normal mode when the control circuit does not transit to the first current limiter mode or the first burst mode after the fourth predetermined period elapses in the overshoot mode;

to send the control signal to the switch driver circuit when the control circuit transits to the overshoot mode, the control signal instructing to alternately switch each of the PMOS transistor and the NMOS transistor between an ON state and an OFF state;

to send the control signal to the switch driver circuit when the control circuit transits to the first current limiter mode, the control signal instructing to put the PMOS transistor into an intermittent OFF state; and to send the control signal to the switch driver circuit when the control circuit transits to the first burst mode, the control signal instructing to put each of the PMOS transistor and the NMOS transistor into a continuous OFF state.

6. The control circuit according to claim 5, wherein the control circuit transits to the overshoot mode when an output voltage of the DC-DC converter circuit increases at a predetermined or greater inclination in the first burst mode.

7. The control circuit according to claim 5, wherein the control circuit transits to the overshoot mode when an output voltage of the DC-DC converter circuit increases at a predetermined or greater inclination in the first current limiter mode.

8. The control circuit according to claim 7, wherein the control circuit transits to the overshoot mode when the output voltage of the DC-DC converter circuit increases at a predetermined or greater inclination in the first burst mode.

* * * * *